Figure 1:
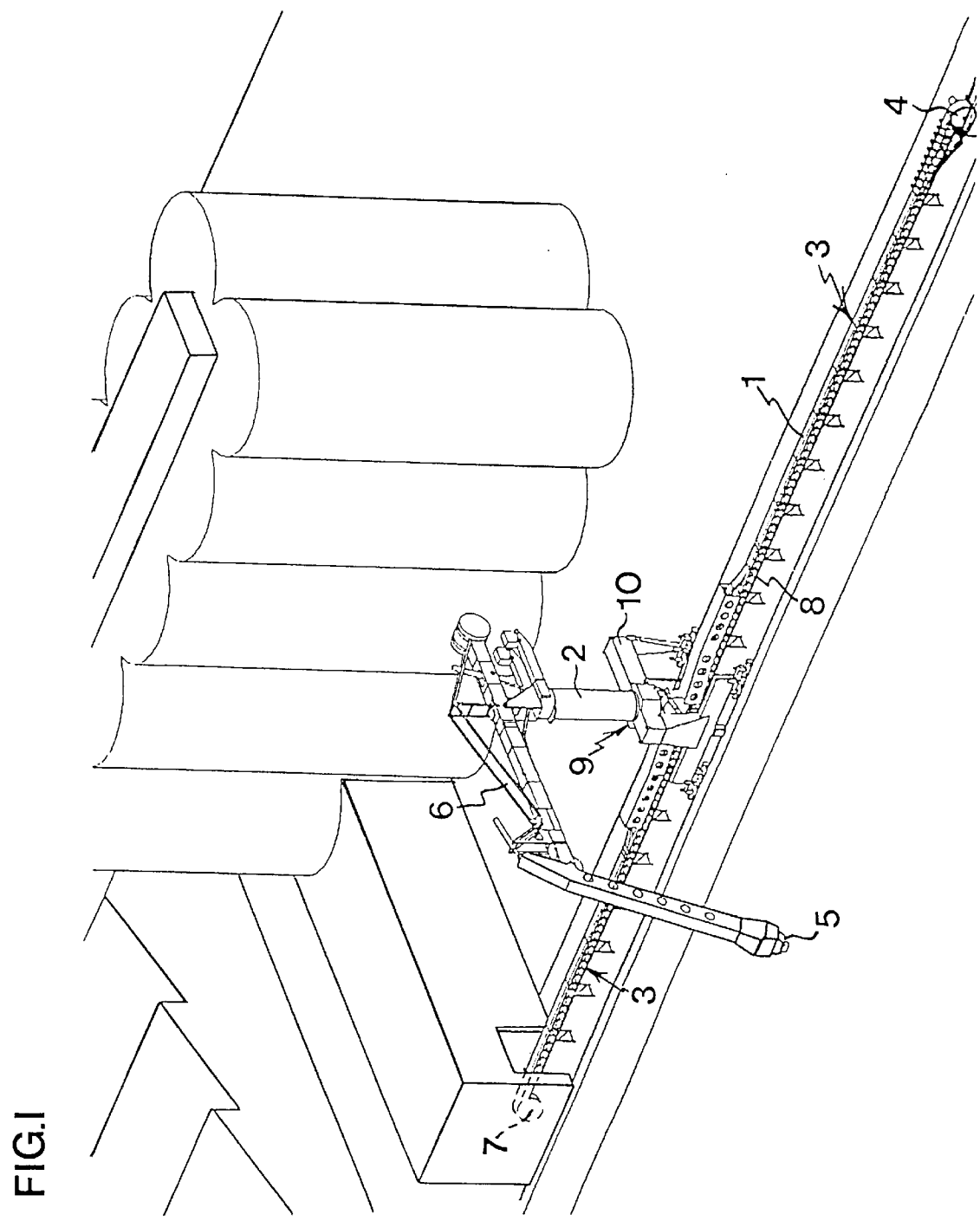

United States Patent [19]
Tingskog

[11] Patent Number: 6,021,889
[45] Date of Patent: Feb. 8, 2000

[54] CONVEYOR BELT WITH DEFLECTION ROLLERS

[75] Inventor: Lennart Tingskog, Råå, Sweden

[73] Assignee: Conveytech Holding AB, Malmo, Sweden

[21] Appl. No.: 09/198,482

[22] Filed: Nov. 24, 1998

Related U.S. Application Data

[63] Continuation of application No. PCT/SE97/00939, May 30, 1997.

[30] Foreign Application Priority Data

May 31, 1996 [SE] Sweden .................................. 9602127

[51] Int. Cl.$^7$ .................................................. B65G 47/10
[52] U.S. Cl. .................. 198/812; 414/140.2; 414/140.9; 414/142.2; 198/585; 198/819; 198/839
[58] Field of Search .............................. 414/140.9, 142.2, 414/140.2; 198/585, 622, 839, 812, 819

[56] References Cited

U.S. PATENT DOCUMENTS

| | | | |
|---|---|---|---|
| 3,198,353 | 8/1965 | McDowell | 414/140.9 |
| 4,732,523 | 3/1988 | Antikainen et al. | 414/139 |
| 5,060,787 | 10/1991 | Tingskog . | |
| 5,238,346 | 8/1993 | Grathoff | 414/140.9 |
| 5,320,471 | 6/1994 | Grathoff | 414/140.9 |
| 5,351,810 | 10/1994 | Tingskog . | |
| 5,400,899 | 3/1995 | Tingskog . | |
| 5,465,830 | 11/1995 | Tingskog . | |

FOREIGN PATENT DOCUMENTS

| | | |
|---|---|---|
| 470 097 | 11/1993 | Sweden . |
| WO 93/15983 | 8/1993 | WIPO . |

*Primary Examiner*—Jospeh E. Valenza
*Assistant Examiner*—Joe Dillon, Jr.
*Attorney, Agent, or Firm*—Browdy and Neimark

[57] ABSTRACT

A conveyor for an endless, closed-loop conveyor belt (1), which is flexible transverse to its extension, has a guide (11) keeping conveyor belt on a substantially rectilinear main path (3) and on a generally perpendicular branch. A branch device (9) is movable along the main path. There the belt takes two branch paths (19, 20), both parallel with a branch line (26) which is generally transverse to the main path. The branch device (9) comprises two first deflection rollers (14, 23), which are offset in opposite directions laterally from the main path (3). The axes of the two deflection rollers are each perpendicular to a respective deflection plane. Each deflection plance passes through the center of the respective deflection rollers and intersects the main path and the respective branch paths (19, 20) at respective distances from the deflection rollers.

10 Claims, 4 Drawing Sheets

CONVEYOR BELT WITH DEFLECTION ROLLERS

This application is a continuation of copending parent application No. PCT/SE97/00939, filed May 30, 1997.

The present invention relates to a belt conveyor comprising an endless and closed conveyor belt which is flexible essentially merely about axes which are parallel with the transverse direction of the belt, guide means for making part of the conveyor belt follow a substantially rectilinear main path, and a branch device which is movable along the main path, for branching the conveyor belt from the main path via two branch paths which are parallel with a branch line, directed transversely of the main path, respectively to and from an arm, which is pivotable in a plane transversely of the branch line.

A belt conveyor of this type is known from e.g. U.S. Pat. No. 5,465,830, said belt conveyor being intended for feeding out and feeding in goods within an elongated area beside the main path, the branch device comprising a tower movable along a long side of the elongated area and supporting an arm, the free end of which extends into the elongated area. An upper part of the tower, which also supports the arm, is rotatable about a vertical axis.

Belt conveyors of this type are, among other things, used for loading and unloading ships moored alongside the quay, in which case the elongated area is the ship's hold. They are also used in other contexts, for instance for conveying coal to and from coal depots, in which case the depot is the elongated area.

The conveyor belt employed is advantageously of the type described in, for instance, U.S. Pat. No. 5,060,787, U.S. Pat. No. 5,351,810 and U.S. Pat. No. 5,400,899, hereby incorporated by reference. The conveyor belt is designed to be bent, in its closed state, rather in the one than in the other direction about an axis parallel to its transverse direction. The conveyor belt should therefore be passed around a deflection roller with contact between one side of the belt, i.e. the pulling power take-up side, and the deflection roller. To achieve an optimum transition of the conveyor belt between the tower and the arm, the conveyor belt should thus in this case be directed the same way (i.e. in the same direction) in the branch paths adjacent to the arm, which in the known belt conveyor has resulted in a greater height than is desirable for the tower and a neutral position for the arm, which neutral position is not located centrally in the operating area of the arm.

The object of the present invention is to improve in these respects a belt conveyor of the type stated by way of introduction, while the conveyor belt is treated carefully while travelling in the belt conveyor.

By letting, according to the invention, the branch device comprise two deflection rollers, which are offset in opposite directions transversely of the main path and the axes of which are each perpendicular to a deflection plane through the centre of the respective deflection rollers, said plane intersecting the main path and the respective branch paths at a distance from the first deflection rollers, a height reduction can be made, in practice corresponding to the distance required for turning the conveyor belt through ½–¾ turn about its own longitudinal axis.

According to the invention, the input and output runs of the conveyor belt are thus laterally redirected in opposite directions in the transition between the main path and the branch, such that the entire vertical movement in the branch, including the upwards and downwards running branch paths, can take place in an essentially common plane transversely of the main path. Moreover, the redirection takes place in points where the transverse direction of the belt is essentially vertical when the branch line is vertical. This prevents the conveyor belt from being laterally bent.

In the preferred embodiment, the position of the first deflection rollers in the deflection plane is determined by a plane through the branch line essentially being tangent to the periphery of the first deflection rollers in the radial plane through the centre of the respective deflection rollers. As a result, such a fixed turning of the conveyor belt from the main path to each part of the branch paths which is closest to the main path can be accomplished that the arm becomes pivotable about a neutral position, which can be directed essentially transversely of the main path.

The branch device suitably comprises two second deflection rollers, whose axes are parallel and located in the respective deflection planes adjacent to the intersection of the respective deflection planes with the branch line.

This design makes it possible to fully prevent the belt from being bent laterally, i.e. in the belt's own plane, which is most important since such a bending may shorten the life of the conveyor belt to a most considerable extent. Also the stress on the belt caused by a turning thereof around its own longitudinal direction is reduced through the invention, but this stress affects the life of the belt very little as long as it is symmetrical around the centre line of the belt.

In the preferred embodiment of the belt conveyor according to the invention, the branch device further comprises two third deflection rollers, the axes of which are located in the intersection of the respective deflection planes with the main path. Seen from the third deflection rollers towards the respective first deflection rollers, the conveyor belt can be turned in opposite directions or in the same direction.

For the above exemplified conveyor belt to have its pulling power take-up side facing the same direction in the two branch paths, which is advantageous with regard to the transition of the conveyor belt between the branch paths and the extents of the conveyor belt along the arm, the conveyor belt, seen from the two second deflection rollers towards the respective first deflection rollers, is turned in opposite directions. This requires that the conveyor belt along the main path have its pulling power take-up side directed downwards and that it be turned in the same direction between the main path and the respective one of the third deflection rollers as between the respective one of these and the respective first deflection rollers.

Thus, the invention creates conditions for the adjustment turnings necessary for the function to be distributed uniformly on the upward and downward runs of the conveyor belt. As a result, the required space in the vertical direction is halved compared with the case where the adjustment turnings are effected merely by means of one of the upward and downward runs. Furthermore, the invention creates conditions for the belt runs along the branch paths to be parallel with the underside facing the same direction, which halves the required space in the vertical direction for operational turning of the arm around a central or neutral position approximately in the centre of the operating area of the arm.

Figure 2:
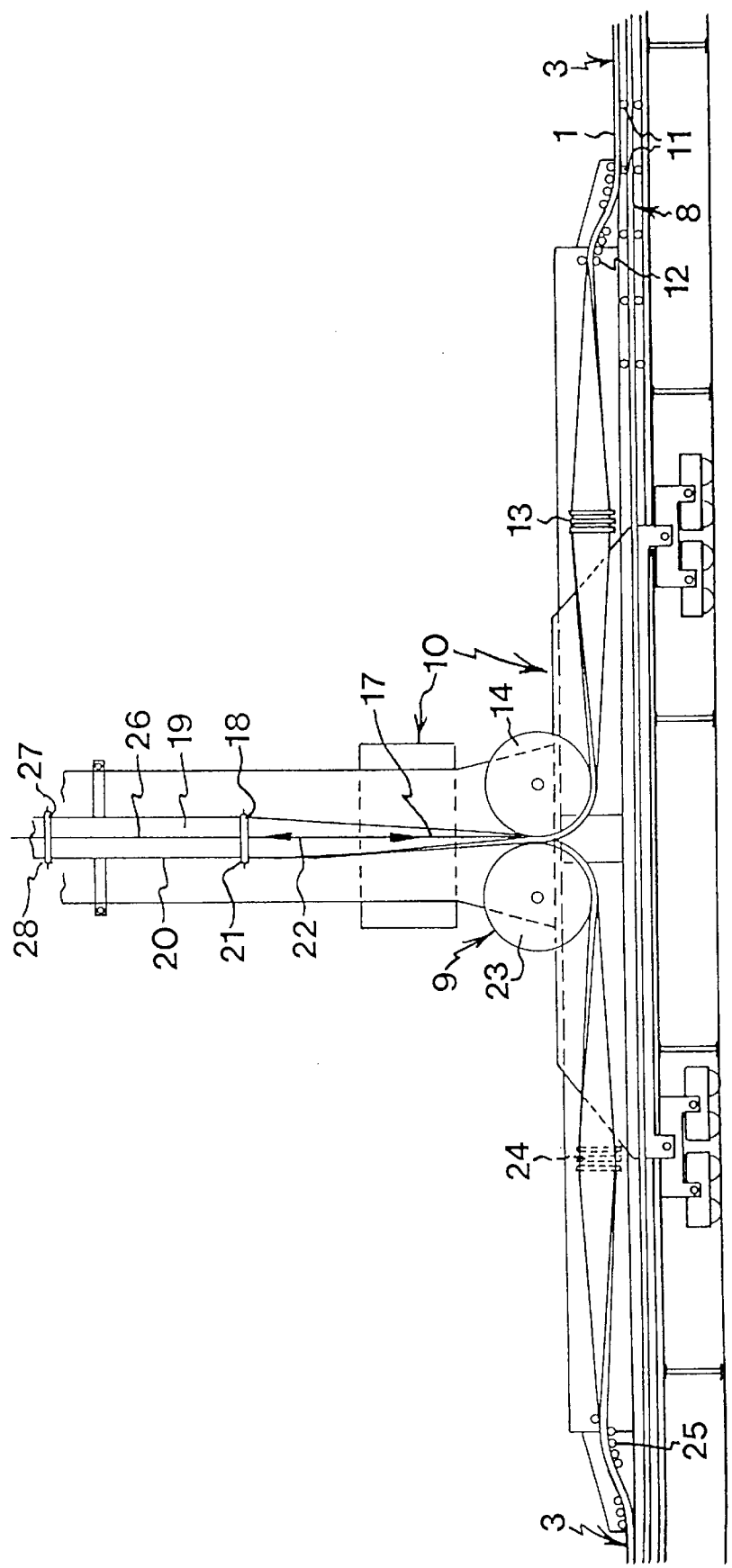
Figure 3:
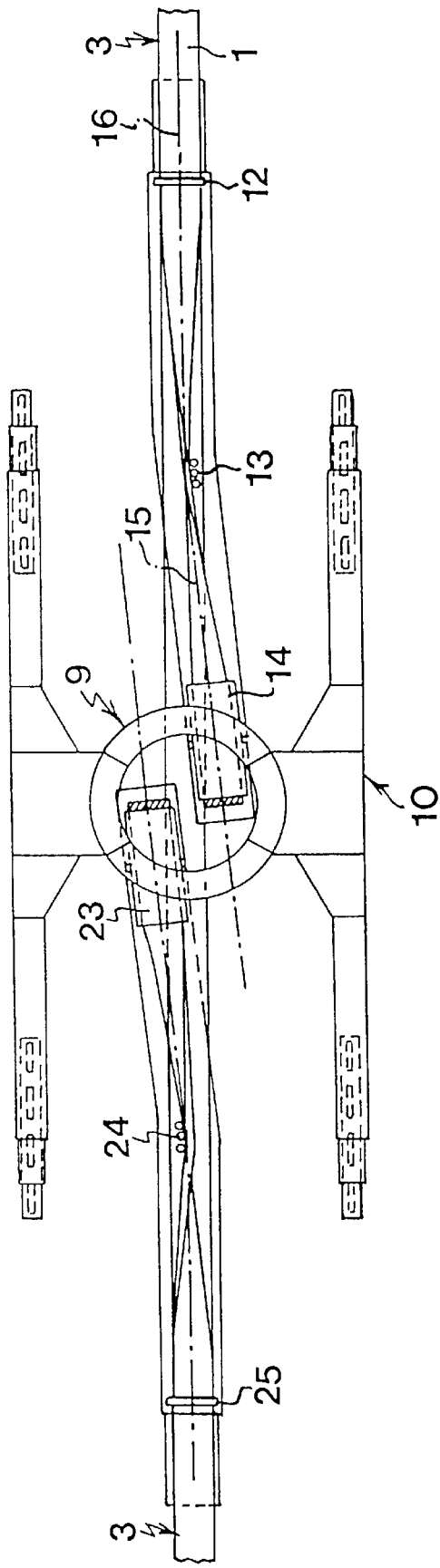
Figure 4:
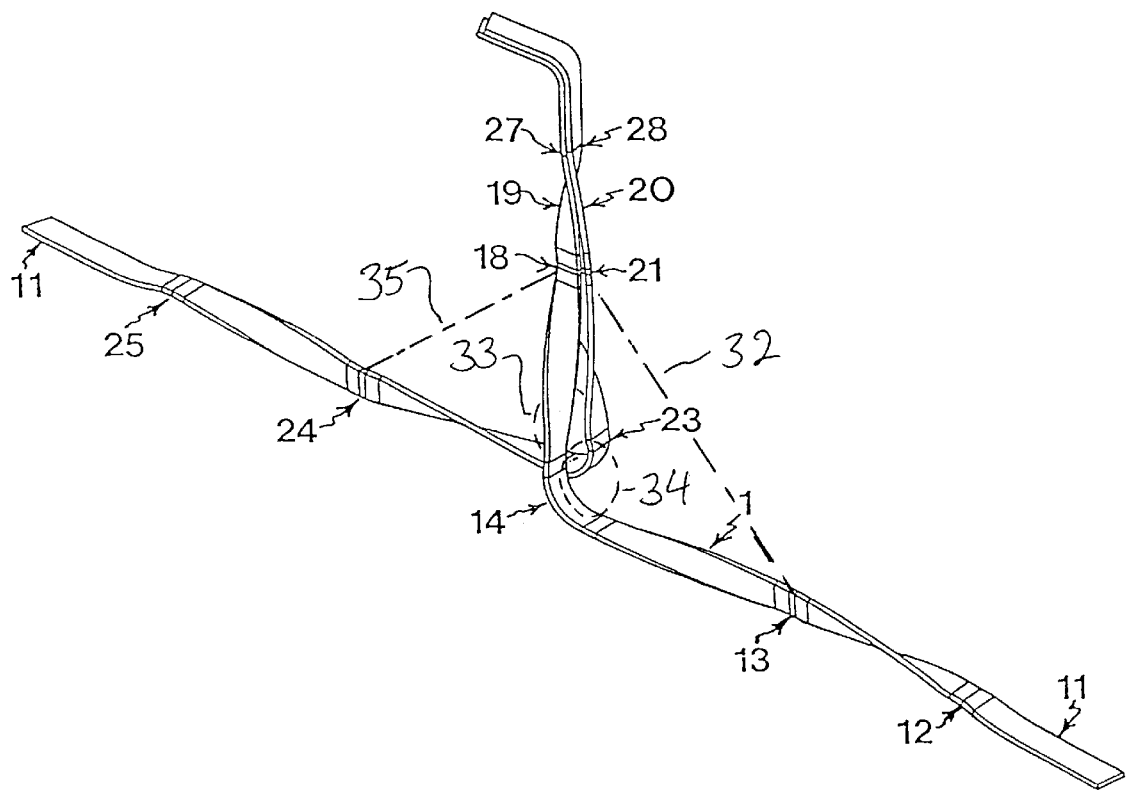

An embodiment of a belt conveyor according to the invention will now be described with reference to the accompanying drawings, in which FIG. 1 is a perspective view of an embodiment of a belt conveyor according to the present invention, FIG. 2 is side view of the travel of the belt in a branch position of the belt conveyor in FIG. 1, FIG. 3 is a top plan view of the same branch point as shown in FIG. 2, and FIG. 4 is a perspective view of merely the conveyor belt in the branch point in FIGS. 2 and 3.

FIG. 1 shows a conveying plant along a quay with an embodiment of a belt conveyor according to the invention. The belt conveyor comprises a conveyor belt 1 which is closed and endless, and a tower 2, which is movable back and forth along a main path 3 of the conveyor belt 1. The path of the conveyor belt 1 extends more specifically from a first deflection roller 4 along the main path 3 to the tower 2, up through the tower and out to a free end 5 of an arm 6 projecting from the tower 2, back from the end 5 of the arm 6 to the tower 2 and down through the tower, along the rest of the main path 3 to a second deflection roller 7 and along a return path 8 under the main path back to the first deflection roller 4.

The tower is supported by a branch device 9, which comprises a frame 10, a so-called portal, which is movable on wheels for moving the tower 2 along the main path 3. The branch device 9 will be described in more detail below with reference to FIGS. 2 and 3.

As appears from FIG. 2, the conveyor belt 1 is supported by rollers 11 along the main path 3 and is raised from the main path by means of one or more rollers 12 mounted in the frame 10 and having a horizontal axis at one end of the frame 10. The conveyor belt 1 is passed from the rollers 12 in the same direction as the main path 3 towards the tower 2 during turning through about 90° about its longitudinal direction to at least one guide roller 13 having an essentially vertical axis, which is also mounted in the frame 10. From the guide roller 13 the conveyor belt 1 travels during continued turning through about further 90° to a deflection roller 14 having a slightly inclined axis, which is also mounted in the frame 10. Between the guide roller 13 and the deflection roller 14 the conveyor belt 1 follows a path, whose centre line 15 makes such an angle with the centre line 16 of the main path 3 that the deflection roller 14 is essentially located on one side of the centre line 16 of the main path 3.

After a deflection of about 90° around the deflection roller 14, the belt is passed in a branch direction 17 up to a guide roller 18 having a horizontal axis, which is also mounted in the frame 10. From the guide roller 18, the conveyor belt 1 travels vertically up along a branch path 19 through the tower 2 and further out in the arm 6, in whose free end 5 a feed-in or feed-out device can be mounted depending on whether loading or unloading is to be carried out. The upper part of the tower 2 is rotatable relative to the frame 10, which means that the conveyor belt 1 will be turned around its longitudinal direction along the branch path 19 when rotating the upper part of the tower 2 and, thus, the arm 6.

The conveyor belt 1 then passes back from the free end 5 of the arm 6 into the tower 2 and down through the tower in a branch path 20 to the level of the guide roller 18, where a corresponding guide roller 21, whose axis is parallel to the axis of the guide roller 18, guides the conveyor belt 1 in a branch direction 22 down to a deflection roller 23 corresponding to the deflection roller 14 and further via guide rollers 24 and 25 corresponding to the guide rollers 13 and 12 out on the rest of the main path 3 in the direction of the second deflection roller 7.

FIG. 4 shows lines defining two deflection planes. Dot-dash line 32, which extends between the edges of the belt 1 at roller 13 and at roller 18, lies within the first deflecticon plane. This first deflection plane also includes circle 34, which coincides with a central circumference of deflection roller 14. The central circumference 14 coincides in FIG. 3 (a plan view) as dot-dash line 15. Similarly, the second deflection plane includes straight line 35 between the edges of the belt 1 at roller 21 and at roller 24, together with the central circumference 33 of roller 23.

The lines 32 and 35, lying in the respective deflection planes, also lie within a center plane defined by the dot-dash center line 16 of the main path, shown in FIG. 3, and branch direction 17 which is shown in FIG. 2 by a double-ended arrow. In other words, the deflection planes intersect the center plane along lines 32 and 35.

It will be appreciated that if the axis of the deflection roller 14 is perpendicular to a plane formed between the centre line 15 and the branch direction 17, and the deflection roller 14 is centred relative to the same plane, the conveyor belt 1 will, in its extent between the guide rollers 13, 18, not be subjected to any lateral bending since all parts of the conveyor belt 1 at the same distance from the centre line thereof will have the same distance to pass.

To make this apply also to the conveyor belt 1 in its extent along the branch paths 19, 20, when these have an essentially common centre line or branch line 26, a plane through this common centre line 26 should essentially be tangent to the periphery of the two deflection rollers 14, 23 in the radial plane through the centre of the respective deflection rollers, i.e. in fact be tangent to the circle constituting the position of the centre of bending of the conveyor belt 1 in the path around the respective deflection rollers 14, 23. The distance between the axes of the deflection rollers 14, 23, which are essentially parallel in the top plan view in FIG. 3 and are slightly inclined towards each other, is then approximately equal to the sum of the radii of the deflection rollers 14, 23.

The preferred form of the path of the conveyor belt 1 in the embodiment shown in FIG. 1 of a belt conveyor according to the present invention is shown more clearly in FIG. 4, which merely illustrates the actual conveyor belt 1. The positions of the different guide and deflection rollers, however, are indicated by arrows.

It should be mentioned that the conveyor belt 1, as stated by way of introduction, may be of the type described in U.S. Pat. No. 5,060,787, i.e. have a planar central part and two planar edge parts, which are each hingedly connected to the central part via a hinge part, the central part and the edge parts being flexurally rigid about the longitudinal direction of the conveyor belt and the combined width of the edge parts being greater than and the width of the hinge parts being essentially smaller than the width of the central part.

If the goods to be conveyed is cement or some other easily fluidising material, the conveyor belt 1 can suitably be of the type described in U.S. Pat. No. 5,351,810, i.e. equipped with a longitudinal strip which is fixedly connected to one side of the central part and projects upwards therefrom and which is located in the overlapping area of the edge parts, and, optionally, driver strips which are fixedly connected to the bottom part and the longitudinal strips and which extend from the longitudinal strip to at least one lateral edge of the central part.

Most advantageously, the conveyor belt 1, however, is of the type described in U.S. Pat. No. 5,400,899, i.e. one of its edge parts is divided into two sections closest to its free longitudinal edge so as to form a longitudinal pocket which is open towards the free longitudinal edge and in which the free edge portion of the other edge part is received substantially non-rotatably and positively retained owing to the connection between the edge parts and the central part.

The last-mentioned embodiment of the conveyor belt 1 is advantageous, in that e.g. no belt-guiding means are needed on the upper side of the conveyor belt 1 along its main path 3.

Further modifications of the above embodiments of an inventive conveyor are obvious to those skilled in the art.

For instance, the arm 6 could be designed so as to project on opposite sides of the tower, which may affect the best position of the conveyor belt 1 along the branch paths 19, 20. However, the conveyor belt 1 should, independently of its extent in the arm 6, be guided essentially parallel to the fixed guide rollers 18, 21 and deflection rollers 27, 28, which are mounted in the rotatable upper part of the tower 2.

Finally, two or more deflection rollers, each having a relatively small diameter, may replace any deflection roller having a comparatively larger diameter, as illustrated in e.g. FIG. 2 in respect of the deflection rollers 12 and 25. Thus, this applies to all the deflection rollers described above. The deflection rollers having the smaller diameter are then arranged along a curved path, preferably in the form of a circular arc, along which the conveyor belt is to travel.

I claim:

1. A belt conveyor comprising an endless and closed conveyor belt (1) which is flexible about one axis which is parallel to a transverse direction of the belt, a guide (4, 7, 11) along which a part of the conveyor belt follows a substantially rectilinear main path (3), and a branch device (9) which is movable along the main path, wherein the conveyor belt branches from the main path via two substantially parallel branch paths (19, 20) directed generally transverse to the main path, the branch device including an arm (6), which is pivotable in a plane transverse to the branch line, to and from which the branch paths are movable;

wherein the branch device (9) comprises two first deflection rollers (14, 23), which are offset transversely to the main path (3) and wherein axes of the first deflection rollers are perpendicular to respective deflection planes through the centers of the respective deflection rollers, said deflection planes intersecting the main path and the respective branch paths (19, 20) at predetermined distances from the first deflection rollers.

2. A belt conveyor as claimed in claim 1 wherein the branch device (9) on a side opposite to the respective third deflection rollers (13, 24) relative to the respective first deflection rollers (14, 23) has a fourth deflection roller (12, 25) for lifting off the conveyor belt (1) from the main path (3).

3. A belt conveyor as claimed in claim 1, wherein a plane including the branch line (26) being tangent to respective peripheries of the first deflection rollers in radial planes through the centers of the respective deflection rollers.

4. A belt conveyor as claimed in claim 1 wherein the transverse direction of the conveyor belt (1) in the branch paths (19, 20) closest to the main path (3) is essentially parallel to the longitudinal direction of the main path.

5. A belt conveyor as claimed in claim 1 wherein at least one of the deflection rollers (14, 23; 18, 21; 13, 24; 12; 25) is one of a plurality of deflection rollers, which are arranged along a curved path, optionally in the form of a circular arc, along which the conveyor belt is to travel.

6. A belt conveyor as claimed in claim 1, comprising two second deflection rollers (18, 21), axes of which are parallel and located in the respective deflection planes adjacent to the intersection of the respective deflection planes with the branch line (26).

7. A belt conveyor as claimed in claim 6, wherein the conveyor belt (1), as seen from the two second deflection rollers (18, 21) towards the respective first deflection rollers (14, 23), is turned in two opposite directions.

8. A belt conveyor as claimed in claim 1 comprising two third deflection rollers (13, 24), axes of which are located in the intersection of the respective deflection planes with the main path (3) and are substantially perpendicular to a transverse direction of the conveyor belt (1) along the main path.

9. A belt conveyor as claimed in claim 8, wherein the axes of third deflection rollers (13, 24) are essentially vertical.

10. A belt conveyor as claimed in claim 8, wherein the conveyor belt (1), seen from the two third deflection rollers (13, 24) towards the respective first deflection rollers (14, 23), is turned in opposite directions.

* * * * *